P. M. GRANT.
MANGER.
APPLICATION FILED JAN. 13, 1910.
1,063,919.
Patented June 3, 1913.
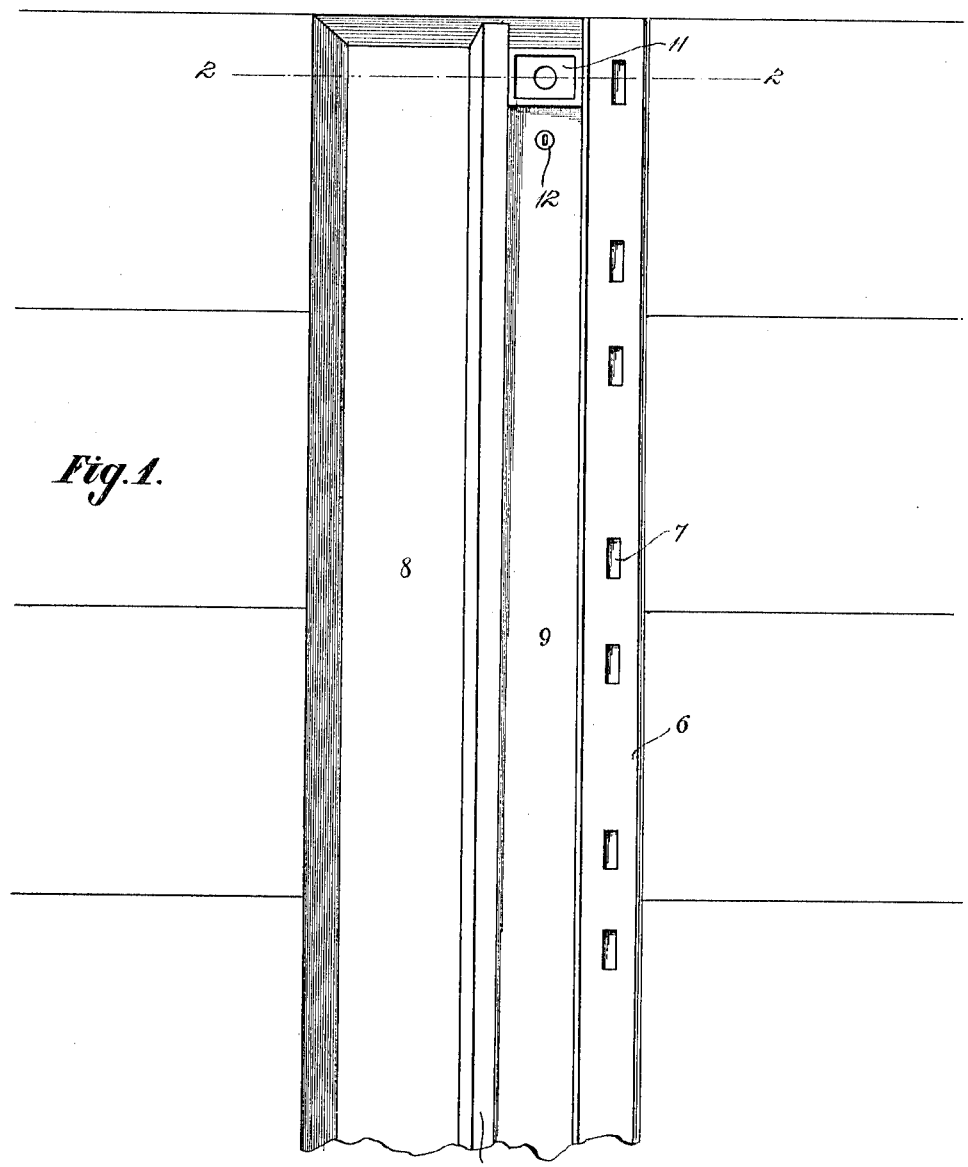
Fig. 1.
Fig. 2.
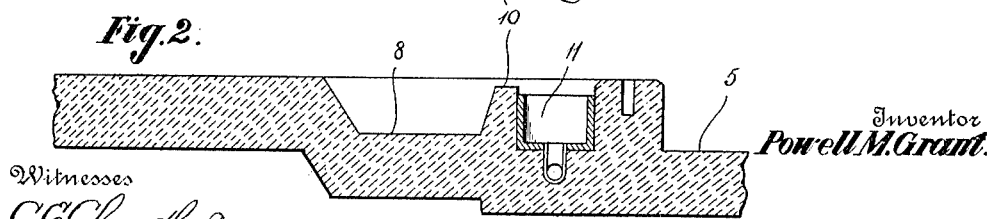
Inventor
Powell M. Grant.
Witnesses
C. C. Chandlee
H. O. Sanders
By Chandlee & Chandlee
Attorney

UNITED STATES PATENT OFFICE.

POWELL M. GRANT, OF BLOOMVILLE, NEW YORK.

MANGER.

1,063,919.  Specification of Letters Patent. Patented June 3, 1913.

Application filed January 13, 1910. Serial No. 537,868.

*To all whom it may concern:*

Be it known that I, POWELL M. GRANT, a citizen of the United States, residing at Bloomville, in the county of Delaware, State of New York, have invented certain new and useful Improvements in Mangers; and I do hereby declare the following to be a full, clear, and exact description of the invention, such as will enable others skilled in the art to which it appertains to make and use the same.

The invention relates to stock feeders and more particularly to the class of mangers for feeding animals.

The primary object of the invention is the provision of a device of this character in which one or a plurality of animals may be supplied with water and also food in a ready and convenient manner, the water being constantly maintained fresh while the food can be quickly and easily supplied to the device for the feeding of the animal.

Another object of the invention is the provision of a device of this character which is thoroughly sanitary, and that may be readily and quickly cleaned at will.

A still further object is to provide a device of this character in which water will be prevented from escaping on to the adjacent flooring.

With these and other objects in view, the invention consists in the construction, combination, and arrangement of parts, as will be hereinafter more fully described in detail, illustrated in the accompanying drawings, which disclose the preferred form of embodiment of the invention, to enable those skilled in the art to practice the invention, and as pointed out in the claims hereunto appended.

In the drawings:—Figure 1 is a fragmentary top plan view of a manger constructed in accordance with the invention. Fig. 2 is a vertical transverse sectional view on the line 2—2 of Fig. 1.

Similar reference characters indicate corresponding parts throughout the several views in the drawings.

Referring to the drawings by numerals, 5 designates a cementitious bed or foundation formed of plastic material although it may be constructed of any other suitable material so as to form a flooring upon which stock may stand and rising from this bed or foundation 5, is a curbing or vertical wall 6, the same being provided at intervals with vertical recesses 7, opening through its upper face, the recesses being adapted to receive stanchion frames (not shown) for fastening the stock to be fed. The curbing forms a stop which will prevent advance of cattle into the watering trough hereinafter described. Directly in rear of this curbing 6, are spaced parallel troughs 8 and 9, which are separated by a division wall 10, the latter being of slightly less height than the curbing 6, so that should the trough 9 overflow, such overflow will run into the trough 8 until the same can be relieved, the trough 9 being adapted to contain water the same being introduced therein in any convenient manner, while the trough 8, is adapted to receive feed. It is to be understood of course that the length of the troughs 8 and 9, may be varied as the occasion may demand. It will be noted that the foundation or flooring rises at the ends of the troughs to the plane of the top of the curbing and since the division wall is of less height than the curbing, the top face of this division wall will be spaced below the plane of the flooring throughout, so that water splashing from the watering trough on to this wall will be prevented from escaping along the top face of the wall on to the flooring.

At one end of the trough 9, and within the same is disposed an overflow tank 11, the depth of which is considerably less than the depth of the said water tank 9, so that the water within the latter will constantly be maintained at a predetermined level therein and this overflow tank 11, is provided with a suitable exhaust port to permit the discharge of water conveyed or flowing into the same. Adjacent the overflow tank 11, and within the bottom of the trough 9, is a discharge opening 12, which latter is normally closed by a suitable plug and by means of this opening 12, the water confined within the trough 9, may be fully drained therefrom for the purpose of cleaning the same.

The sizes of the troughs may be increased or decreased as desired and likewise the depth thereof.

What is claimed is:—

1. In a manger, a standing floor for the animal, a wall rising therefrom and having a plurality of spaced stanchion receiving recesses in its top face, a second vertical wall rising from said flooring and of a height less than the first named wall, the said latter wall having depressions on opposite sides thereof to provide a water trough between the first and second walls, a floor in front of the manger providing a feed trough between it and the second wall and ends for the troughs having their top edges located on a line with the first named wall and second named flooring.

2. A manger construction embodying a one-piece concrete standing flooring having an alley flooring located spaced therefrom and on a plane thereabove, the intermediate space being provided with a pair of spaced troughs having closed ends to provide a front stanchion attaching wall and an intermediate wall, a drain for one of said troughs and a drain box disposed therein with its top edge located below the top edges of the walls to prevent overflow thereof, the intermediate wall also having its top edge located below the top of the aforesaid portion whereby overflow from the first named trough will flow into the second named trough.

In testimony whereof, I affix my signature, in presence of two witnesses.

POWELL M. GRANT.

Witnesses:
 HUGH A. MITCHELL,
 WILLIAM A. ODELL.

Copies of this patent may be obtained for five cents each, by addressing the "Commissioner of Patents, Washington, D. C."